United States Patent [19]

Aaserude

[11] Patent Number: 4,691,851
[45] Date of Patent: Sep. 8, 1987

[54] APPARATUS FOR HANGING ITEMS FROM VEHICLES

[76] Inventor: Gordon V. Aaserude, 444 La Paloma, El Sobrante, Calif. 94803

[21] Appl. No.: 874,284

[22] Filed: Jun. 12, 1986

[51] Int. Cl.$^4$ ................................................ B60R 9/00
[52] U.S. Cl. .............................. 224/42.45 R; 224/273
[58] Field of Search ................. 224/42.45 R, 42.45 A, 224/329, 314, 42.44, 42.46 R, 42.31, 42.03 R, 42.07; 248/317, 339, 503, 309.1, 291; 362/432

[56] References Cited

U.S. PATENT DOCUMENTS

| | | | |
|---|---|---|---|
| 2,157,001 | 5/1939 | Morley | 224/273 X |
| 2,510,175 | 6/1950 | Hess et al. | 224/42.45 A |
| 2,554,176 | 5/1951 | Edwards | 224/42.45 R X |
| 2,647,669 | 8/1953 | White | 224/42.45 A |
| 2,764,331 | 9/1956 | Bigos | 224/42.45 R |
| 3,114,530 | 12/1963 | Shilling | 224/42.45 R X |
| 3,178,144 | 4/1965 | Kimoto . | |
| 3,341,163 | 9/1967 | Honig | 362/432 X |
| 3,746,294 | 7/1973 | Johnston | 211/107 X |
| 3,998,418 | 12/1976 | Boulanger . | |
| 4,455,006 | 6/1984 | Aaserude . | |

*Primary Examiner*—Stephen Marcus
*Assistant Examiner*—Robert M. Petrik
*Attorney, Agent, or Firm*—Harry A. Pacini

[57] ABSTRACT

The present invention relates to an apparatus for hanging an item from vehicles comprising an elongated rigid bracket arm for removably rigidly attaching to a window channel of the vehicle at a first end, an elongated rigid support arm the lower end resiliently contacting the side or window of the vehicle, the second end sharing a common pivot or hinge with the bracket arm, and an elongated extension arm the support end for hanging an item, such as a lantern; and the lower end sharing a common pivot or hinge with the bracket arm and support arm; and when folded together the three arms fold into each other for easy storage and easy unfolding for installation on the vehicle.

4 Claims, 5 Drawing Figures

(SECTION A-A)

APPARATUS FOR HANGING ITEMS FROM VEHICLES

BACKGROUND OF THE INVENTION

In the past, it has been desirable to hang lanterns on other items from vehicles for a myriad of uses. A device for hanging lanterns and the like from modern vehicles, such as automobiles, recreational vehicles, trucks, vans, etc., are still desirable. These hangers are used during camping and other outdoor activities when, for example, light is needed away from the vehicle. However, the hangers of the past usually required special structural additions to the vehicle for their attachment. Lantern hangers of the past could not be quickly assembled or disassembled nor could they be mounted to the side of a vehicle such that they would not mar or damage the painted finish. The lantern hangers of the past were not practical for use on modern vehicles.

Various descriptions of forms of hangers are available in the prior art. Among those considered are the following: U.S. Pat. Nos. 3,178,144 to Kimoto; 3,341,163 to Honig; 3,998,418 to Boulanger; and 4,455,006 to Aaserude. These disclose lantern holders for use with a vehicle or the like. However, each of the patents can be distinguished. Kimoto describes and claims a lantern holder with various clamping means for securing the holder in a plurality of positions.

Honig relates to a lantern hanger for boats. The hanger rod fits into a support bracket. This device is not readily suitable for mounting in an auto window or auto rain gutter. This device requires a support bracket securably attached to the boat for mounting of the device.

Boulanger relates to a rod-like post of linear configuration for mounting in an oar-lock of a boat. The device is to be used in a substantially upright position above the boat. This device is not readily usable with a vehicle.

Aaserude relates to an apparatus having a bracket arm with securing means to the vehicle, a rod with means to contact a vehicle side, and engaging the bracket arm and wherein said rod is adjustable in length, and a support strap connected to the bracket arm and the rod.

The present invention overcomes the problems of the past and provides a lantern hanging apparatus for mounting on the side of a vehicle that can be quickly assembled and disassembled and not mar the painted finish of the vehicle.

SUMMARY OF THE INVENTION

The present invention is an apparatus for hanging items from the side of a vehicle. It is adaptable for mounting to the roof gutter system or windows of the vehicle. It can be easily and quickly installed and taken down and stored. It will not mar the painted finish of the vehicle when mounted or be a threat to break a window.

The preferred embodiment of the invention comprises three members: (1) a bracket arm with a first end shaped to fit over the upper edge of a window and fits tightly into the upper window channel or the upstanding rim of the roof gutter system of a vehicle or other apparatus, such as, a trailer, and a second end terminating at a pivot or hinge; (2) a second angular support arm contacts the side of the vehicle with one end and has a second end which shares a common pivot point or hinge with the second end of the bracket arm; and (3) the third arm is an extension arm having a first end provided with means for removably attaching a hanging item, and a second end co-engaging and common with the first member and second member. When extended and in place, the third arm has a locking relationship to said second member and the bracket arm has a locking relationship to said second member.

In a second embodiment, the bracket arm is adaptable to be mounted into a window of a vehicle, in this embodiment the connecting member and the end of the bracket arm is shaped to fit snugly over the top edge of the window glass when the glass is partly down. When the window is then wound up, the member is locked in position by the top edge of the window and the upper window channel in the door of the vehicle.

In the preferred embodiment, each of the three members is elongated and channeled. Each member is so constructed to allow a nesting of the channeled extension when folded in storable configuration. All three members have a common hinge or pivot point. Such that, the front member and the bracket arm pivots and stores inside of the second member in a nested configuration, the angular support arm, and the third member, the extension arm fold with its open side over the nested first and second members and the sides of the channeled third member come down over the sides of the second member. When opened fully, the third member has a lower end which is extended below the common pivot or hinge and cooperates in a locking fashion to hold the extension arm in a rigid position relative to the vehicle and bracket arm.

Hence the locking relationship between the second and third arm member is not permanent. The upper bracket arm can be pivoted and folded into the wider channel of the angular support arm. The wider third member, extension arm can be pivoted and folded over the nested upper bracket arm and angular support arm. When unfolded into the normal position for each member arm to receive a hanging item, the extension arm will lock into position.

A further object of the invention is to provide an apparatus for hanging on a vehicle and for easy mounting to the gutter system window of the vehicle.

Another object of the invention is to provide an apparatus for hanging which is easily attachable to and detachable from a vehicle and will not mar or damage the painted finish of the vehicle or the window.

Another object of the invention is to provide an apparatus for hanging that is essentially unitary, easily storable and easily installed.

DETAILED DESCRIPTION OF THE DRAWINGS

Figure 1:
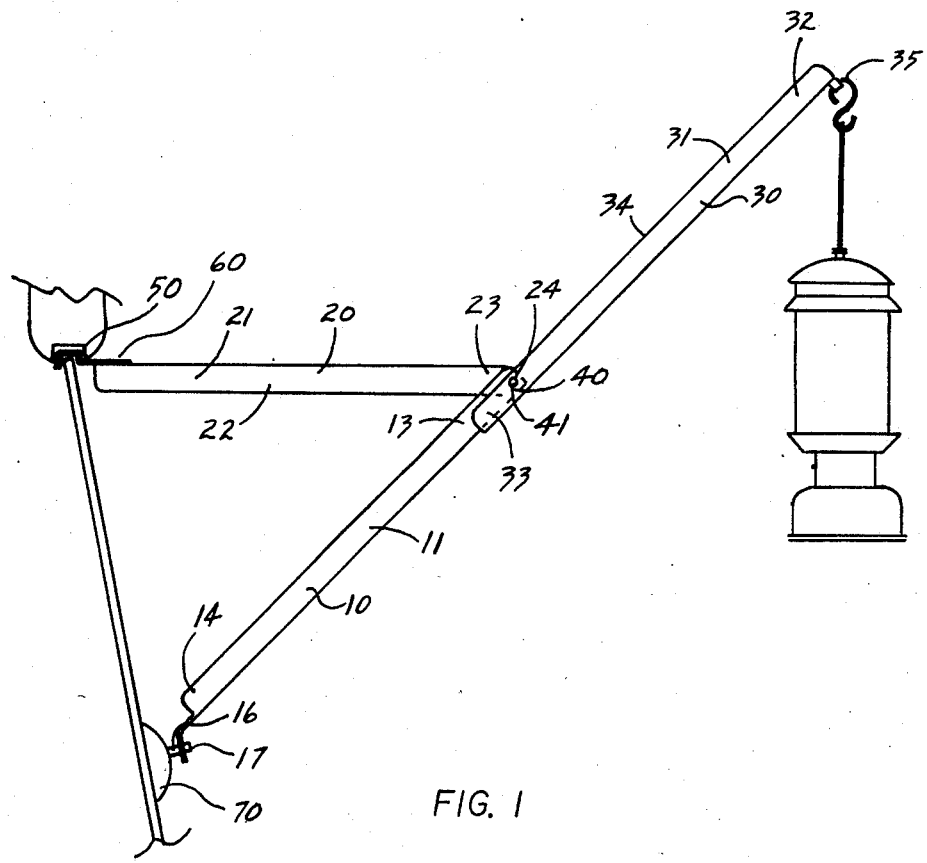
FIG. 1 shows the apparatus of the invention attached to a vehicle.

Referring to FIG. 1, the apparatus of the invention is generally shown installed on a vehicle with a lantern hanging therefrom. The main elements of the primary embodiment of the apparatus are the upper bracket arm 20, the angular support arm 10, the extension arm 30 and common hinge or pivot point 40.

The apparatus can be viewed in three portions each co-acting with each other through the common hinge or pivot point 40, the upper bracket arm of the bracket arm 20, a first extreme end 21 having a means for attaching the bracket arm 20 to the gutter system or the window of the vehicle. A central portion 22 and a second extreme end 23 terminating in common hinge 40. Preferably, the upper bracket arm is a channeled elongated member. The upper bracket arm could also be a pipe or rod just as long as it could fold into the channel of the angular support arm. The second portion consists of a channeled elongated angular member 11, a suction cup 70, and a common hinge pin 41. The suction cup 70 is connected to the channeled elongated angular member by a bolt 16 disposed on the backside of the suction cup and a nut 17. The third portion consists of a channeled elongated extension arm 31, a means for hanging an item therefrom at one end 32 and a hinge 33 with hinge pin 41.

The ends 21 and 23 of the bracket arm 20 and the support arm 10 that contact the vehicle are not connected. The bracket arm 20 and the support arm 10 cooperate and contact each other only at the common hinge 40 and share a common hinge pin 41. This interaction including the interaction with the third member is fully described in the subsequent paragraphs.

Preferably, the bracket arm 20 is of a single piece construction. The arm has three elements, the first end section 21, the central rigid section 22 and the second end 23 having hinge pin hole 24. Although the bracket arm is preferably a single piece channeled construction, each section can be an individual piece joined by suitable means for connecting the pieces in the appropriate arrangement.

Figure 1A:
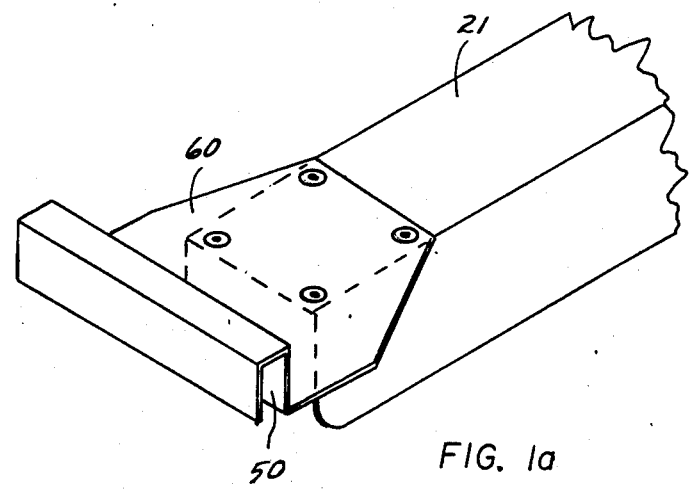
FIG. 1a shows a close-up of an exemplified means for attachment of the upper bracket arms to a roof gutter system of a vehicle.

The end section 60, as seen in FIG. 1a, has an inverted "U" shape 50. This shape allows it to fit easily over the upstanding rim of the gutter system on the vehicle. This inverted "U" shape 50 of the end section 60 also allows the end section 21 to cooperate with the window glass and glass channel of the vehicle. Thus, when mounting the apparatus of this invention in a vehicle window, the inverted "U" of the end section 60 is disposed between the edge of the window glass and the window glass receptacle channel over the window. Hence, the end section "U" shape 50 is shaped to fit snugly over the top of a vehicle window. The window mount 60 is made of thin rigid material so that when the window is wound up it will fit into the window channel of the door while over the window and not damage the window channel. It has been found that a common shape and thickness of rigid material can be used for both mounting without damage to the end section, the window, the window glass receptacle channel.

The main strength member for supporting the apparatus and the item attached thereto is the support arm 10. Therefore, and for subsequent reasons, the support arm 10 is preferably made of channeled material. That is, support arm 10 has its opposing side edges disposed substantially 90° to the planar surface of the support arm, thereby forming a "U"-shaped or channeled configuration. This is a preferred form for support arm 10 to prevent flexing of the arm when the weight of the hanging item is applied to the end 32 of extension arm 30.

Figure 3:
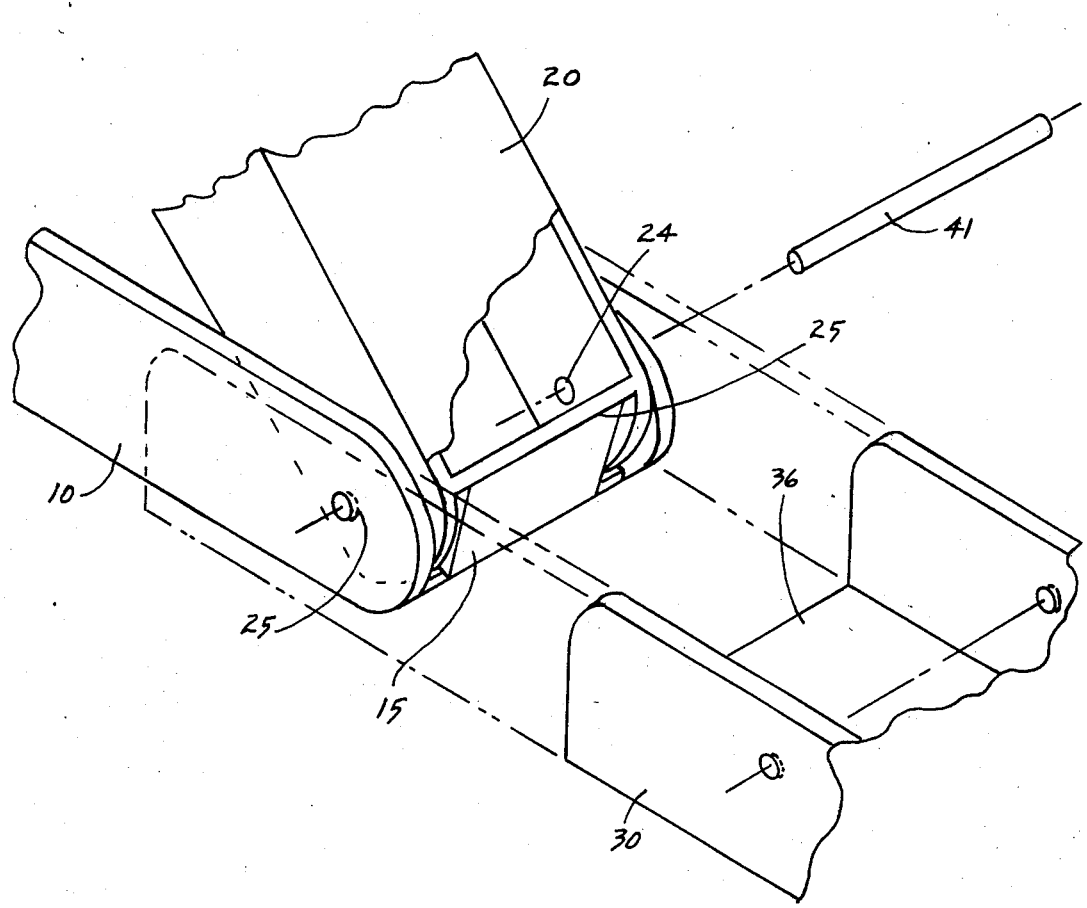
FIG. 3 shows an exploded view of the apparatus hinge or pivot point of the invention.

With reference to FIG. 3 and specifically to the second end 23 of upper bracket arm 30, the end 23 terminates in a practically folded tab 25. Folded tab 25 rests on the end of support arm 10. This establishes the relative fixed angle of arms 10 and 20 in the unfolded open position. This acts as a lock for the two interacting arms 20 and 10.

The bracket arm 20 is preferably made of "U"-shaped or channeled material to gain extra strength for its support. The attaching means 21 can be from the same material cut and pressure formed into the inverted "U" shape. Alternatively, the mounting means 60 can be attached to the central portion 22 of the bracket arm 20 by rivets or similar means for attaching. The second extreme 23 which has openings 24 and 25 for accepting the common hinge pin 41 can likewise be made from the same material as 22 in a unitary fashion or it can be attached by rivets or other equivalent attaching means to the central portion 22. Preferably, the central portion 22 is an inverted "U"-shaped configuration or channel similar to the support arm 10. For ease of storage and compactness, it is preferred that the entire length and width of 20, except for the mounting mean 21, fit snugly within the open opposing channel of the support arm 20. Alternatively, to the inverted "U" or channel configuration for the central portion 22, the central portion 22 can be a rigid bar or pipe. Said bar or pipe likewise being hinged and having at a first extreme end mounting means similar to 21, and at the second extreme end a hinge engaging portion, similar to 23. All other requirements whether channeled configuration, a bar or a pipe remain the same, so that in the folded configuration the central portion pivoting on the common hinge 40 lies within the open channel of the support arm 10.

Figure 2:
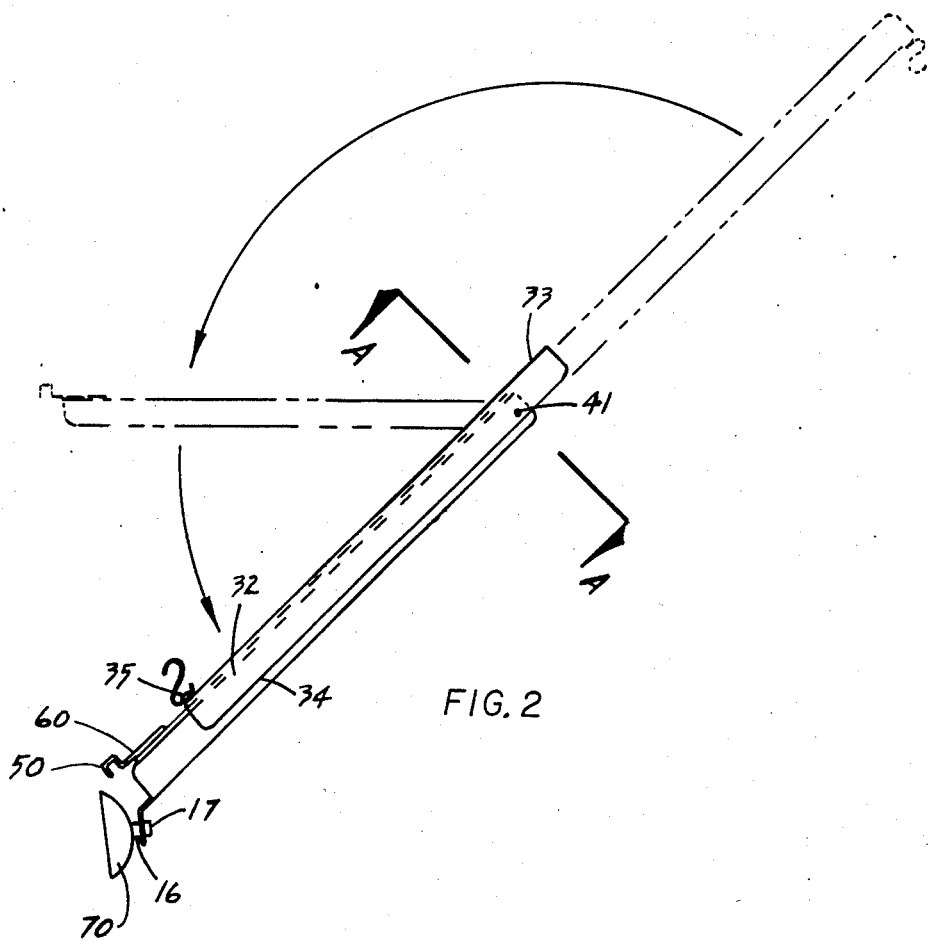
FIG. 2 shows the apparatus in a folded storable configuration.
Figure 2A:
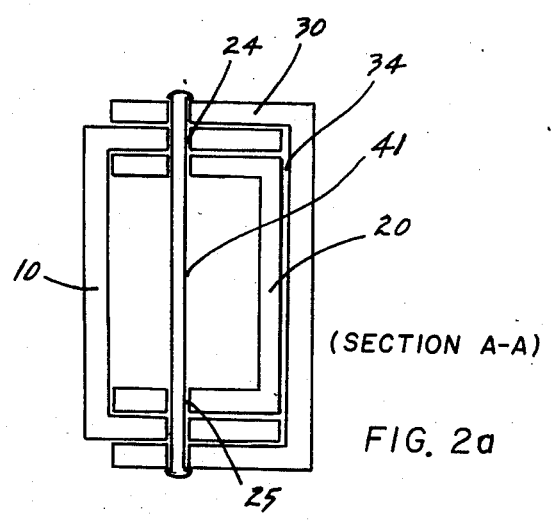
FIG. 2a shows a cross-section view through sight line A—A.

The third portion of the apparatus is the extension arm 30 to which the hanging item is attached at 35 proximate to the first or upper extreme end 32. The extension arm 30 has an upper first or upper extreme end 32, a central channeled portion and a lower second extreme end 33. The central channeled portion has a width such that it will fit over the width of the angular support arm 10, as shown in FIG. 2a. This allows the extension arm 30 (1) to nest the upper bracket arm 20 and angular support arm 10 within its interior channel 34, when in a folded or storage configuration, FIG. 2; and (2) to have an overlapping extension 33 of length of the extension arm beyond the hinge pin 41 mounting at 40, when the apparatus is fully extended and engaged in place. This overlap 33 gives added rigidity and support to the extension arm 30 in its extended position. The overlap 35 cooperates closely with the shape of the angular support arm 10, whether a rounded rod, pipe or an open square "U" channel construction.

When folded, the three portions: the support arm 10, the bracket arm 20 and extension arm 30, are all approximately the same length with the extension arm having a slightly longer length due to the overlap 33. With reference to FIGS. 2 and 2a, in the preferred form and construction, the three portions are made of square channeled material with the support arm 10 in upward "U" configuration, the bracket arm 20 pivoting within and nesting in downward or inverted "U" configuration within the support arm 10; and the extension arm 30 pivoting and folding over the extension arm 30 and over the support arm 10 such that they nest in the channel 34 of the extension arm 30.

With particular attention and reference to the common hinge 40, FIG. 3, the unique feature of the interaction of the three members of the apparatus can be more particularly appreciated. Within the hinge 40, there is a common hinge pin 41 which is the axis for the three members to pivot upon. Each of the three members has a pair of opposed holes in each side of the square channel to accept and communicate with the hinge pin 41 from the hinge 40. It can be seen that the width of the bracket arm 20 is less than the interior channel width 15 of the support arm 11 which in turn is extensively less in width than the interior width 36 of the extension arm 30. These relative interior and exterior dimensions allow the three members to interact at the hinge to form a unitary nested apparatus for storage and to maintain a relative functional spacial configuration when unfolded.

End section 21 of bracket arm 20 may be coated with vinyl or other suitable material. The coating will prevent any damage to the painted finish of the vehicle or to the window glass when the apparatus is mounted in the window.

Referring to FIGS. 1 and 1a, a representative means for connection of the apparatus to a window on a vehicle is shown. In the unfolded form, the extension arm 30 forms a supplementary extension of the support arm 10. The overlap 33 interacts closely with the outer dimension of the support arm 10 to give strength to the extension. The angle is maintained throughout the support arm 10 and extension arm 30. The suction cup 70 rests against the vehicle body or window. The suction cup 70 is constructed of a material such as rubber, polyvinyl resin or thermoplastic which will not mar or damage the painted finish of the vehicle. Suction cup 70 has a bolt disposed from the back side. Bolt 16 and nut 17 connect suction cup 70 to support arm 10. Alignment of the members is achieved through the common hinge 40. By the placement of the suction cup 70, i.e., support arm 10, the height and angle of the extension arm 30 can be determined. Clearly, minimum and maximum angles of contact with the vehicle body are to be avoided. These extremes will result in stable mountings.

The inventor contemplates the invention to be all that is shown, described and claimed in this application. However, there can be various adaptations and variations of the present invention, therefor, the invention is susceptible to various equivalents to achieve the same function in substantially the same way.

I claim:

1. An apparatus for hanging an item from a vehicle comprising:
   (A) an elongated rigid bracket arm having a first end, a second end and a central portion connecting said first and second ends; (1) said first end having a means for attaching said bracket arm removably rigidly into an upper window channel of said vehicle when the window is closed (2) said second end possessing proximate its end remote from said central portion a common hinge point;
   (B) an elongated rigid support arm having an upper first end, a lower second end and a central portion connecting said first end and said second end; (3) said lower second end having means for resiliently contacting the window of the vehicle and said first end pivotally engaging the second end of said elongated rigid bracket arm at the common hinge point;
   (C) an elongated extension arm having an upper first end, a lower second end and a central portion connecting said first end and said second end; (4) at said common hinge point said lower second end pivotally engaging both the second end of said elongated rigid bracket arm and the first end of said elongated rigid support arm and said upper first end having proximate thereto a means for hanging an item therefrom;
   (D) said rigid bracket arm, rigid support arm and extension arm share a common hinge point and are foldable capable of nesting one in the other in a nested configuration.

2. The apparatus of claim 1 wherein there is further means for connecting the first end of the elongated rigid bracket arm to the upstanding rim of the roof gutter system of said vehicle.

3. The apparatus of claim 1 wherein each of the bracket arm, support arm and extension arm pivot on the common hinge point and when folded nest all within each other.

4. The apparatus of claim 1 wherein each of said bracket arm, support arm, and extension arm are open channeled members having a common hinge capable of nesting one in the other the bracket arm in the support arm and both into said extension arm.

* * * * *